US006944172B2

United States Patent
Sankey et al.

(10) Patent No.: US 6,944,172 B2
(45) Date of Patent: Sep. 13, 2005

(54) SYSTEM AND METHOD FOR TIME-BASED SCHEDULING

(75) Inventors: Wayne Robert Sankey, Plano, TX (US); Ross Alexander Jamieson, Plano, TX (US); John Kevin Weeks, Richardson, TX (US); Marlon B. Roa-Diaz, Plano, TX (US); Paul Anthony Elias, Richardson, TX (US); Michael Joseph Mezeul, Allen, TX (US); Nimer Ibrahim Yaseen, Allen, TX (US)

(73) Assignee: Covaro Networks, Inc., Richardson, TX (US)

( * ) Notice: Subject to any disclaimer, the term of this patent is extended or adjusted under 35 U.S.C. 154(b) by 0 days.

(21) Appl. No.: 10/856,531

(22) Filed: May 28, 2004

(65) Prior Publication Data

US 2004/0264486 A1 Dec. 30, 2004

Related U.S. Application Data

(60) Provisional application No. 60/474,008, filed on May 29, 2003.

(51) Int. Cl.$^7$ .............................................. H04L 12/28
(52) U.S. Cl. ...................... 370/412; 370/350; 370/399; 710/112
(58) Field of Search ......................... 370/412, 389–396, 370/468, 399, 236, 379–382, 230.1, 450; 709/230, 238, 245, 235; 710/112

(56) References Cited

U.S. PATENT DOCUMENTS

| | | | | |
|---|---|---|---|---|
| 5,596,576 A | * | 1/1997 | Milito | 370/450 |
| 5,604,742 A | * | 2/1997 | Colmant et al. | 370/396 |
| 5,633,867 A | * | 5/1997 | Ben-Nun et al. | 370/399 |
| 6,182,177 B1 | * | 1/2001 | Harriman | 710/112 |
| 6,560,230 B1 | * | 5/2003 | Li et al. | 370/412 |
| 6,829,649 B1 | * | 12/2004 | Shorey et al. | 709/235 |
| 6,839,321 B1 | * | 1/2005 | Chiruvolu | 370/230.1 |

* cited by examiner

Primary Examiner—Chi Pham
Assistant Examiner—Prenell Jones
(74) Attorney, Agent, or Firm—Haynes and Boone, LLP (57) ABSTRACT

Provided are a system and method for time-based scheduling in a communications environment. In one example, the method includes assigning at least one token to each of multiple active queues during a predefined period of time. Each token authorizes an amount of data to be dequeued from the queue. The method also includes waiting until the end of the predefined period of time before starting a new round of assigning. At least one of the queues is nominated based on the token assigned to the queue, where the nomination authorizes the dequeuing of the amount of data from the queue. The nomination is sent to a memory system to dequeue the data and send the data to a network uplink.

20 Claims, 7 Drawing Sheets

Fig. 9b

SYSTEM AND METHOD FOR TIME-BASED SCHEDULING

CROSS-REFERENCE

This application claims priority from U.S. Provisional Patent Application Ser. No. 60/474,008, filed on May 29, 2003, and entitled METHOD FOR TIME-BASED SCHEDULING, which is hereby incorporated by reference in its entirety.

BACKGROUND

Communications systems frequently handle different types of information (e.g., data, voice, video, etc.) that may be transmitted on a single physical communications channel. Each type of information may have different transmission requirements, such as buffering, latency, and latency variation. To satisfy these different requirements, the system may use a scheduler to handle each type of information differently as the information is admitted into a network. However, current schedulers are limited in their abilities.

Accordingly, what is needed is a system and method for providing improved scheduling in a communications network.

DETAILED DESCRIPTION

This disclosure relates generally to communications systems and, more particularly, to providing a system and method for time-based scheduling in communication networks. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1A:
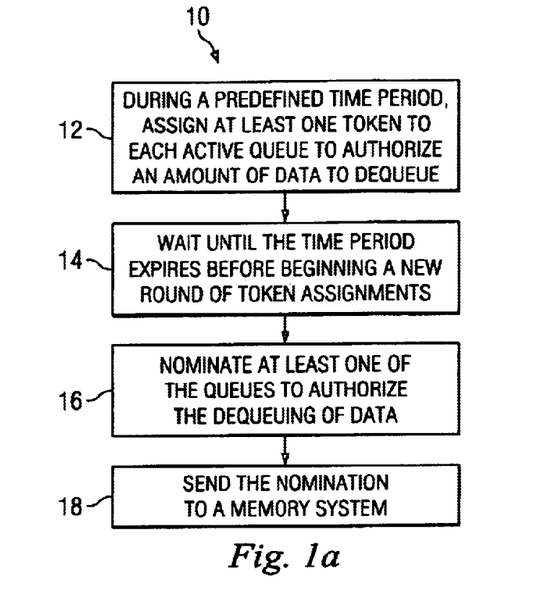
FIG. 1a is an exemplary flow chart of a scheduling method.

Referring to FIG. 1a, an exemplary method 10 for scheduling traffic in a communications network is illustrated. As will be described later in greater detail, the method 10 may calculate and assign one or more tokens to each of one or more queues. The tokens are then used to regulate the dequeuing of information from each queue.

In step 12, the method 10 may assign one or more one tokens to each of a plurality of active queues during a predefined period of time. Each token authorizes an amount of data to be dequeued from the queue. As will be described later, the predefined time period provides improved control of the scheduling. In step 14, the method 10 waits until the end of the predefined period of time before starting a new round of assigning. Sequentially or simultaneously, at least one of the queues may be nominated based on the at least one token assigned to the queue. The nomination of a queue authorizes the dequeuing of the amount of data (authorized by the token) from the queue. In step 18, the nomination is sent to a memory system to dequeue the data and send the data to a network uplink.

Figure 1B:
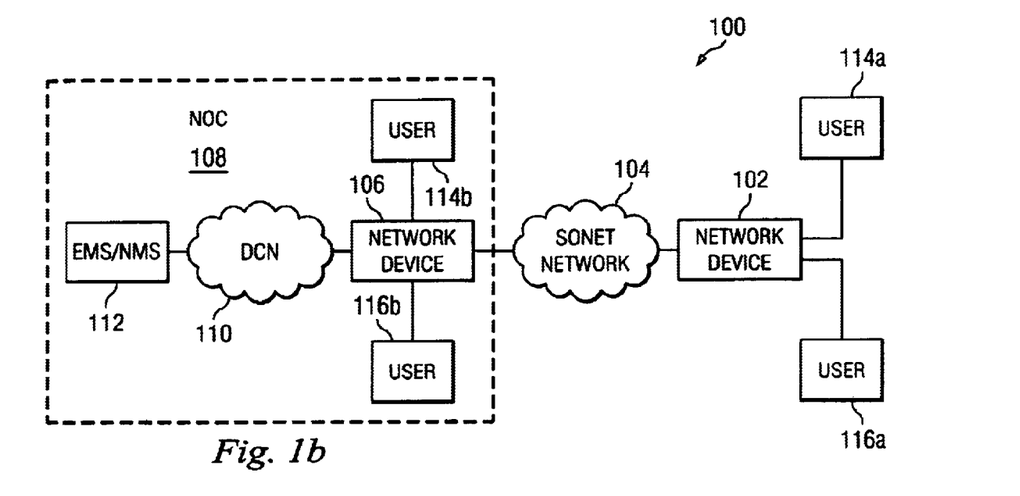
FIG. 1b illustrates one embodiment of an exemplary communications system within which a scheduler may be used.

Referring now to FIG. 1b, one embodiment of an exemplary system 100 is illustrated. The system 100 includes a first network entity 102 connected via a synchronous optical network (SONET) 104 to a second network entity 106. For purposes of clarity, the term SONET is used throughout the present disclosure to refer to SONET and/or synchronous digital hierarchy (SDH). Accordingly, it is understood that references to SONET may be replaced with references to SDH, although some minor changes may be needed, as will be known to those of skill in the art. Although a network entity in the present disclosure may be any network accessible component, device, or system (hardware and/or software), the network entity 102 may be an Ethernet-over-SONET entity configured to perform PPP processing.

In the present example, the network entity 106 is in a NOC 108 that also includes an EMS/NMS 112 connected to the network entity 106 via a data communications network (DCN) 110. Users 114a and 116a may access the network 104 via the network entity 102, while users 114b and 116b may access the network 104 via the network entity 106. It is understood that additional users, network entities, networks, and/or subnets may be connected to various elements of FIG. 1. Accordingly, FIG. 1 is for purposes of example only and has been simplified to better illustrate the present disclosure. Furthermore, it is understood that other networks and/or protocols may be used, such as ethernet or token ring.

Figure 2:
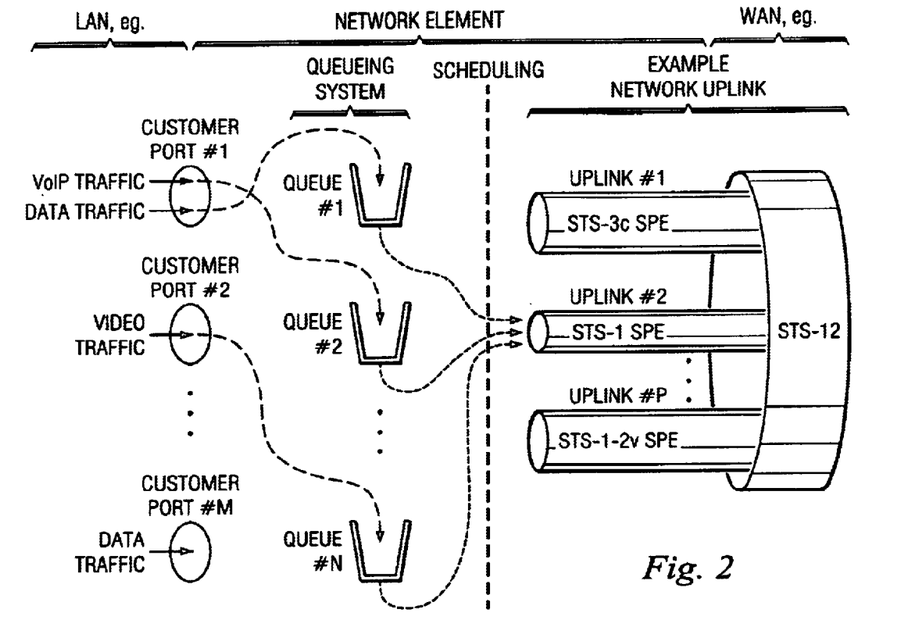
FIG. 2 is a diagram illustrating an exemplary data flow for admitting data into the system of FIG. 1.

With additional reference to FIG. 2, in communications systems such as the system 100 of FIG. 1, various types of information (e.g., data, voice, video, etc.) may be transmitted on a single physical communications channel. However, each type of information may have different transmission requirements, including requirements such as buffering, latency, and latency variation. To satisfy these different requirements, the system may handle each type of information differently as the information is admitted into the network. Accordingly, the admission of received information from many sources into a single communications channel may use circuitry and/or software that satisfies the handling needs of the various types of information. The processing which accomplishes this is called "scheduling," and the hardware and/or software that implements the scheduling is called a scheduler.

In general, traffic is sent to a network element (NE) from multiple customer ports 1-M. The traffic from these ports is classified and then placed into a queue system, where different traffic from the ports may go into 1-N different queues. The queueing system and the ports are generally orthogonal spaces. There is a mapping function (called "classification") that determines how the traffic from the customer ports is routed to the individual queues.

Once traffic is placed into the multitude of N queues, it is forwarded to one or more network uplinks. For example, traffic from many queues may be sent into a particular STS-1 synchronous payload envelope (SPE), which may be one of 1-P logical uplinks contained in an STS-12. It is understood that this process may be applied to many different technology types, such as SONET, SDH, ethernet, token ring, etc. As previously stated, the queueing system and the logical uplinks are orthogonal spaces, and there exists a mapping function which determines to which uplink the traffic from a given queue will go. The scheduler determines how the uplink bandwidth is divided into small increments of time amongst the competing clients (queues). The method executed by the scheduler may determine how much delay, delay variation, traffic burst size, etc., the traffic in each queue may experience. The method may be based on different ordering techniques, such as a per-PDU (protocol data unit) (e.g., a cell, frame, or packet) technique.

Figure 3:
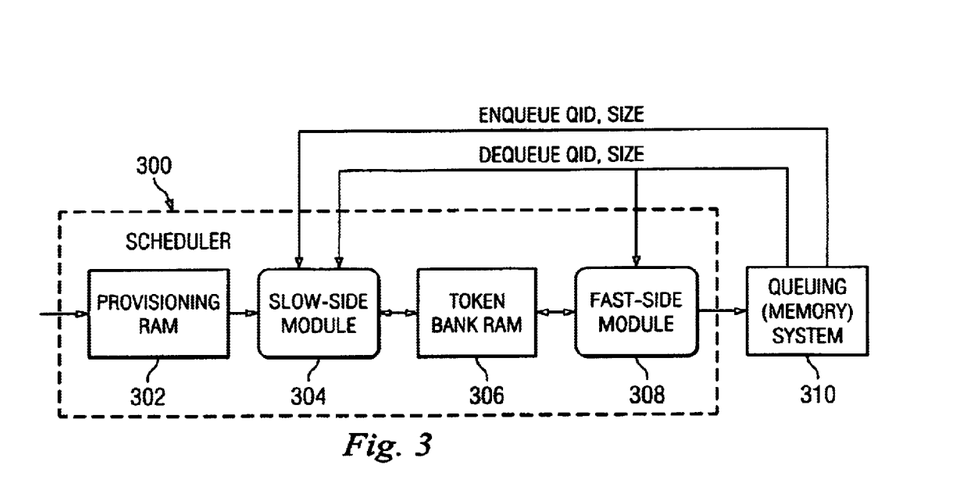
FIG. 3 is one embodiment of a scheduler having slow-side and fast-side modules that may be used to control the data flow of FIG. 2 into one or more uplinks.

Referring now to FIG. 3, one embodiment of a scheduler 300 is illustrated. The scheduler 300 includes provisioning random access memory (RAM) 302, a slow-side module 304, token bank RAM 306, and a fast-side module 308. In the present example, the scheduler 300 is in communication with a queuing (e.g., memory system) 310. As will be described later in greater detail, the scheduler 300 is designed to send instructions to a memory system directing the memory system to dequeue a PDU from a particular queue. When the PDU is removed from the given queue, it is sent to a selected uplink logical channel, possibly after being placed into a small holding area (e.g., a first in, first out (FIFO) queue) that enables rate matching of the uplink data to the dequeued data from the memory system.

It is understood that the scheduler 300 of FIG. 3 is only one possible implementation of a scheduler. For example, the scheduler may be implemented using a digital circuit RTL (Register Transfer Level) description that may be synthesized by a logic synthesizer and realized in a VLSI chip, or as a Field Programmable Gate Array (FPGA). The scheduler may contain various memories (e.g., registers) and multiple functions realized in software and/or hardware. Accordingly, the following description is not limited to the specific structure described.

Exemplary parameters of the dequeued PDUs that the scheduler 300 may control include: a committed input rate (CIR) of each queue, a peak input rate (PIR) of each queue subject to uplink availability, latency of a VoIP queue (e.g., the scheduler may attempt to keep latency so low that latency variation is unimportant), burstiness of data traffic for queues, and a rate needed to keep an uplink full given it could be full per provisioning. The CIR is the minimum rate to admit traffic to the network given a non-empty queue, and the PIR is the maximum rate to admit traffic to the network given a non-empty queue. For purposes of illustration, excess bandwidth (e.g., the difference between PIR and CIR) is denoted PIR*. It is understood that references to the terms CIR and PIR may also refer to CIR and PIR tokens representing those rates.

Using the above information, the scheduler may make delayed or real-time decisions about which queues to dequeue traffic from, and then sends these dequeue instructions to the queueing system. The traffic that is dequeued may be PDU data in the form of cells, packets, or frames of fixed or varying sizes.

In the present example, the scheduler 300 includes two primary parts: the slow-side module 304 and the fast-side module 308. The slow-side module 304 executes using a millisecond timebase which ensures that time sensitive calculations are performed correctly. The fast-side module 308 executes more quickly than the slow-side module and searches for queues that have data ready to be dequeued and also available bandwidth to use for the dequeues. The two modules are separated by the token bank RAM 306 (e.g., dual port RAM) that is used to hold the information that is passed between the slow-side module 304 and the fast-side module 308 of the scheduler 300 and vice versa.

For purposes of example, an analogy may be used where the scheduler 300 acts somewhat like a bank or clearing house for authority to dequeue PDUs from the various queues. In effect, the slow-side module 304 fills the various accounts in the bank at the correct rate, and the fast-side module 308 withdraws all available funds from the accounts as fast as it can. The fast-side module 308 in turn tells the slow-side module 304 how much it withdrew from each account so the slow-side module 304 can ensure it continues to keep the proper amount of money going into the various accounts. In addition, the fast-side module 308 attempts to solve the issues of traffic shaping, congestion control and fairness of dequeuing among the uplinks and the queues.

The scheduler 300 may be designed using the slow-side and fast-side modules because there may be two competing requirements for the scheduler as a whole. Firstly, in order to execute with a high degree of absolute time accuracy and resolution, the scheduler should have a well controlled rate of execution. Secondly, the scheduler also should try to get the uplink filled to the highest degree possible using possibly varying sized PDUs, and this goal is at odds with the first goal.

The slow-side module 304 is used to allocate CIR and PIR* "tokens" to the fast-side module 308. In the present example there are 512 queues, and the slow-side module 304 obtains the following provisioning inputs from the provisioning RAM 302 on a per-queue basis: CIR, PIR*, Valid, VoIP, Master, Slave, and Paired QID. As previously described, CIR is the minimum rate to admit traffic to the network given a non-empty queue, and PIR* is the maximum rate to admit traffic to the network given a non-empty queue. "Valid" instructs the scheduler to perform the calculations for this queue as it is going to be carrying traffic. "VoIP" instructs the scheduler that this queue contains information that is sensitive to delay and delay variation. "Master" indicates the leader of a binary queue pair (which will be described later in greater detail), while "Slave" indicates the follower of a binary queue pair. "Paired QID" is valid only for a Master and includes a pointer to the Slave QID that is paired with the Master. The slow-side module 304 may also receive an uplink data rate (e.g., a capacity of the channel being scheduled into) as a provisioning input on a per-uplink basis (e.g., 12 logical uplinks). The uplink data rate affects the CIR calculated by the slow-side module 304.

The slow-side module 304 may also obtain the following real-time information from the queueing system 310: number of bytes enqueued into a memory system, a queue number to which traffic was enqueued, number of bytes dequeued from the memory system, and a queue number from which the traffic was dequeued.

Figure 4:
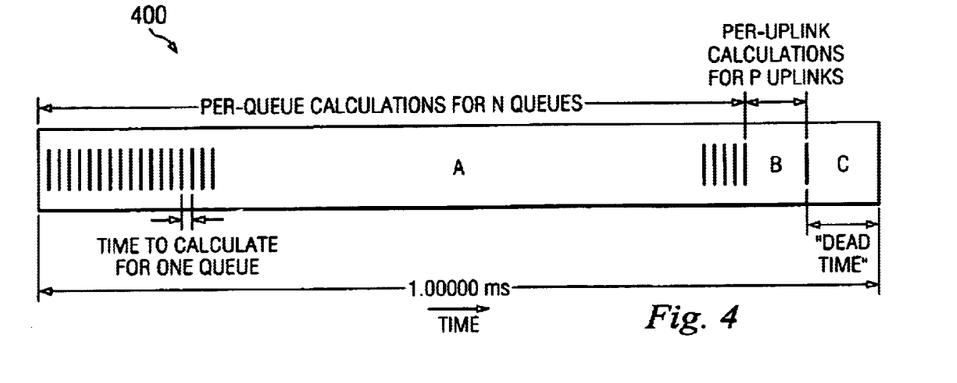
FIG. 4 illustrates a predefined segment of time and various tasks performed by the slow-side module of the scheduler of FIG. 3 during the time segment.

Referring now to FIG. 4, a time segment 400 illustrates how a predefined period of time may be subdivided and used by the slow-side module 304 of FIG. 3. For purposes of example, a millisecond timebase is used, but it is understood that other timebases may be used. The slow-side module 304 divides time into precisely known units (e.g., one millisecond) and performs its calculations based on that defined time base. This allows for fine control of the scheduling parameters as requested by a network operator. For example, in the present implementation, the calculations for each queue are executed exactly 1000 times per second, which therefore gives the scheduler a 1.00000 ms time base. The accuracy of the slow-side module 304 may be a function of the clock that is being used to run the associated circuitry (e.g., using a twenty parts per million (ppm) clock source will ensure a scheduling accuracy of twenty ppm). If the calculations are performed on a per-bit basis, the slow-side module 304 may operate with a bandwidth resolution of 1 kbps. If the calculations are performed on a per-octet basis, the slow-side module 304 may operate with a bandwidth resolution of 8.0 kbps.

The time segment 400 is divided into periods A, B, and C. Period A includes the period of time used for per-queue calculations for N queues. Period B includes the period of time used for per-uplink calculations for P uplinks. These calculations will be described later in greater detail. Period C is reserved as "dead time" to ensure that the time segment 400 equals one millisecond is used (e.g., during the "dead time", the slow-side module may be doing nothing but waiting in order to align to the 1.00000 ms boundaries as closely as possible) and may be used as needed by either of the periods A and B. It is understood that, in some embodiments, the period C may equal zero if the entire period is used by the periods A and/or B. After the expiration of the dead time, the slow-side module 304 may begin its next set of calculations at a new millisecond boundary.

In the present example, the calculations that occur in the scheduler 300 are self-correcting between subsequent calculation (e.g., 1.0 ms) intervals. Accordingly, the long-term accumulated scheduling error is equal to 0. This result may be accomplished by arranging for the bandwidth used in one scheduling interval to be known by the next scheduling interval. For example, if a queue sends 1000 octets too much traffic into the uplink in one interval, 1000 available octets may be subtracted from the subsequent interval.

It is understood that many different calculations may be performed. For example, during period B of the time segment 400, the available aggregate bandwidth for an uplink may be calculated as equal to the uplink bandwidth minus the requested CIR for the uplink. Because the scheduler 300 may calculate the uplink actual overhead bandwidth used on a per-frame basis, each user receives the amount of the uplink that he has requested. This may provide the advantage of isolating each user from the others in terms of the required encapsulation bandwidth used in cases where the uplink requires the use of some type of encapsulation technology (e.g., PPP over SONET, ethernet over SONET). Accordingly, one user does not consume more than his fair share of the uplink bandwidth.

Figure 5:
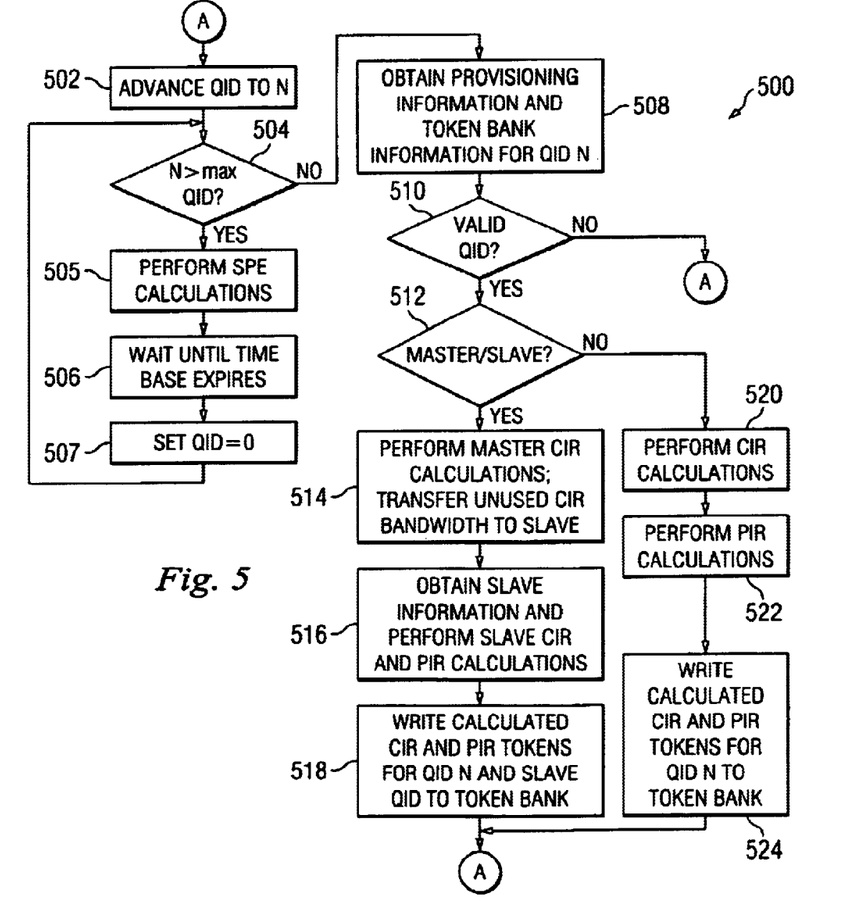
FIG. 5 is a flow chart of an exemplary method that may be executed for each queue by the slow-side module of the scheduler of FIG. 3.

Referring now to FIG. 5, a method 500 may be executed during a predefined time period (e.g., period A of FIG. 4) for each QID using a predefined timebase (e.g., the one milli-second timebase of FIG. 4) to ensure that time sensitive calculations are performed correctly. The method 500 begins in step 502 by advancing the QID to N. In step 504, a determination may be made as to whether N is greater than the maximum QID. If N is greater, then there are no more queues to be handled during the current time segment and the method continues to step 505, where it performs SPE calculations (this may correspond to the period B of segment 400). In step 506, the method 500 enters a wait state (e.g., the period C of segment 400), before setting the QID to zero in step 507 and returning to step 504. If N is not greater than the QID (this branch may correspond to the period A of the segment 400), then the method continues to step 508, where provisioning information and token bank information are obtained for the current queue (QID N). The provisioning information obtained may include CIR, PIR*, Valid, VoIP, Master, Slave, Paired QID, and uplink data rate. The token bank information obtained may include the number of bytes dequeued from the memory system during the last predefined time interval (e.g., millisecond), as well as the previous PIR and CIR.

In step 510, a determination is made as to whether the obtained information includes a valid QID. As previously described, a QID that is valid means that the scheduler is to perform calculations for this queue as the queue is going to be carrying traffic. If the QID is not valid, the method 500 returns to step 502, where the QID is advanced. If the QID is valid, method continues to step 512, where a determination is made as to whether the queue is a master/slave using, for example, provisioning information such as the Master, Slave, and/or Paired QID described previously. If the queue is determined to be a master, then the method continues to step 514 and performs CIR calculations for the master using, for example, the obtained CIR and uplink data rate provisioning information. The obtained CIR provisioning information provides a ceiling used to regulate the number of CIR tokens that can be allocated.

In addition, unused CIR bandwidth may be transferred in step 514 to the slave. This allocation of unused bandwidth may occur because of the master/slave relationship that may exist between a pair of queues that enables unused output bandwidth from a given queue to be granted to another queue with which it is associated (e.g., a binary queue). Such a binary queue enables queues to be paired together to parallel the simultaneous provisioning of two services using a single provisioning command. Such simultaneous provisioning enables a network operator to negotiate, provision, and manage a single Service Level Agreement (SLA) with a customer for those two services. For example, a binary queue may be used to allow a VoIP and data connection to be jointly negotiated, with the data connection automatically receiving unused VoIP bandwidth in real-time. In such a scenario, the VoIP traffic may be provisioned with a certain CIR and the data traffic may be provisioned with a certain PIR. Accordingly, the CIR that is unused by the VoIP queue may be transferred as CIR to the data queue.

Figure 6A:
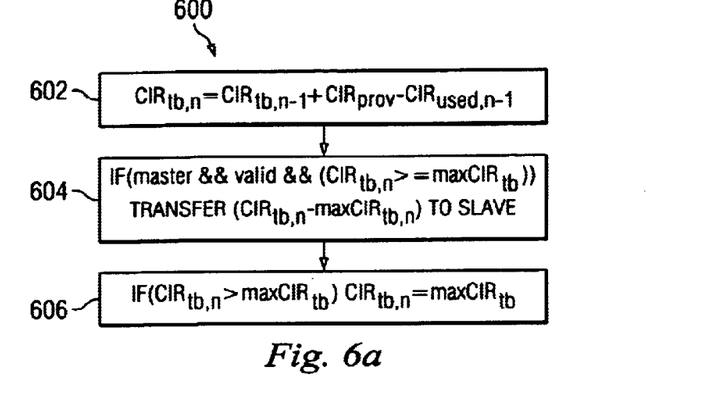
FIG. 6a is a flow chart of an exemplary method that may be used to calculate a committed input rate for a queue during the execution of the method of FIG. 5.

With additional reference to FIG. 6a, an exemplary method 600 illustrates one process for calculation of the CIR and, if applicable, allocation of unused CIR to a slave queue. In step 602, the CIR for the current QID is calculated as $$CIR_{tb,n} = CIR_{tb,n-1} + CIR_{prov} - CIR_{used,n-1}$$

where, "tb,n" indexes the token bank entry for the current QID at the present time period, "prov" indicates the provisioned CIR, and "used,n−1" indicates the CIR tokens used in the precious time period. If the CIR calculation is for a master queue, the method 600 may continue to step 604 and calculate whether there is any unused CIR to be allocated to the slave using:

if (master && valid && ($CIR_{tb,n}$>=$maxCIR_{tb}$))

transfer ($CIR_{tb,n}$−$maxCIR_{tb,n}$) to slave.

In step 606, the method 600 may limit the CIR tokens calculated for QID N to the maximum tokens allowed for QID N:

if ($CIR_{tb,n}$>=$maxCIR_{tb}$)

$CIR_{tb,n}$=$maxCIR_{tb}$.

Referring again specifically to FIG. 5, in step 516, slave information may be obtained (e.g., using the Paired QID) and CIR and PIR* calculations may be performed for the slave. The CIR calculations may be performed as previously described, and exemplary PIR* calculations may be performed as described in greater detail in FIG. 6b.

Figure 6B:
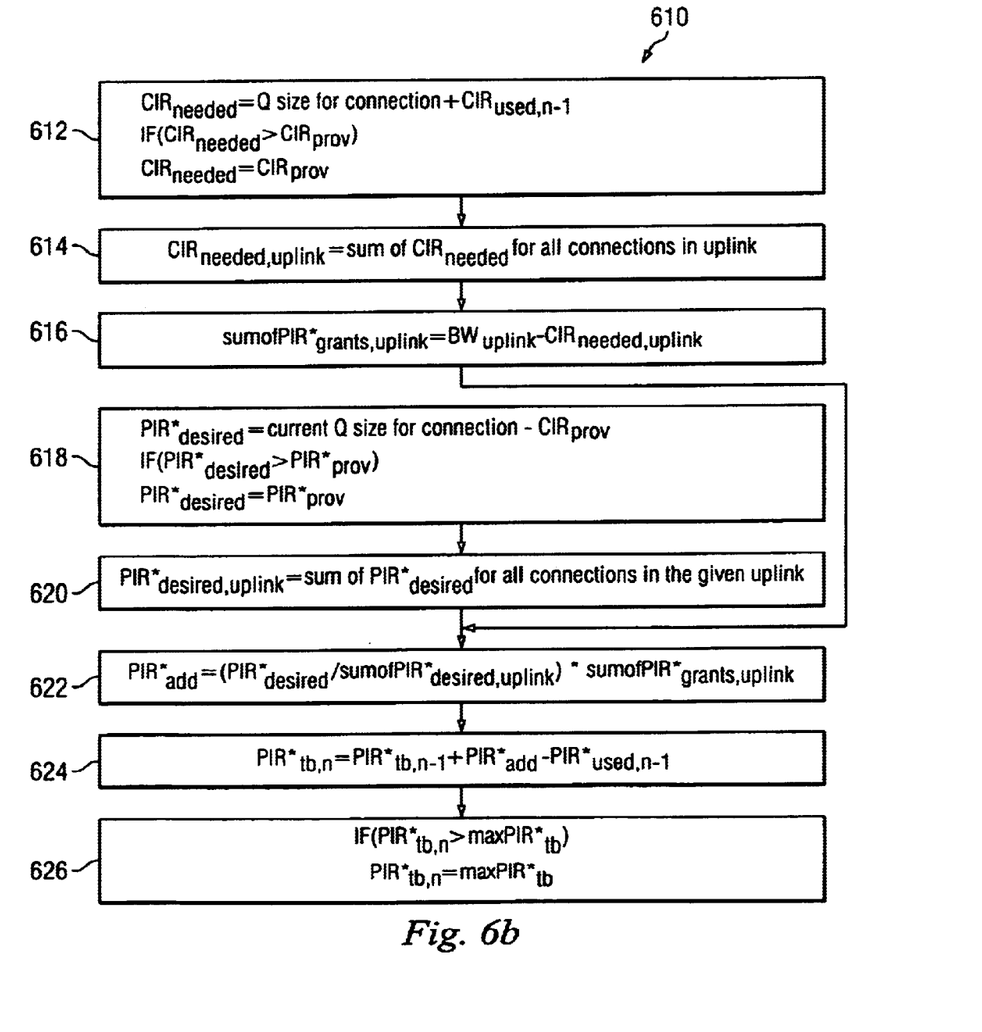
FIG. 6b is a flow chart of an exemplary method that may be used to calculate a peak input rate for a queue during the execution of the method of FIG. 5.

With additional reference to FIG. 6b, an exemplary method 610 illustrates one process for calculation of the PIR*. In step 612, the method 610 may calculate the needed number of CIR tokens as $CIR_{needed}$=Q size for connection+$CIR_{used,n−1}$.

In addition, the method 610 may limit the needed number of CIR tokens to the number of provisioned CIR tokens using if ($CIR_{needed}$>$CIR_{prov}$)

$CIR_{needed}$=$CIR_{prov}$.

In step 614, the amount of needed CIR tokens for the uplink may be calculated as $CIR_{needed,uplink}$=sum of $CIR_{needed}$ for all connections in uplink.

In step 616, the total granted number of PIR tokens is calculated as sumofPIR*$_{grants,uplink}$=$Bandwidth_{uplink}$−$CIR_{needed,uplink}$.

In step 618, the method 610 may calculate the desired number of PIR tokens as

PIR*$_{desired}$=current Q size for connection−$CIR_{prov}$

In addition, the method 610 may limit the desired number of PIR tokens to the number of provisioned PIR tokens using if (PIR*$_{desired}$>PIR*$_{prov}$)

PIR*$_{desired}$=PIR*$_{prov}$.

In step 620, the amount of desired PIR tokens for the uplink may be calculated as sumofPIR*$_{desired,uplink}$=sum of PIR*$_{desired}$ for all connections in the given uplink.

In step 622, the calculations from steps 616 and 620 are used to calculate the PIR* tokens to be added as follows:

PIR*$_{add}$=(PIR*$_{desired}$/sumofPIR*$_{desired,uplink}$)*sumofPIR*$_{grants,uplink}$.

In step 624, the PIR for the token bank indexed at N is calculated as

PIR*$_{tb,n}$=PIR*$_{tb,n−1}$+PIR*$_{add}$−PIR*$_{used,n−1}$.

In step 626, the method 610 may limit the number of PIR* tokens given to QID N to the maximum number of PIR* tokens in the token bank using if (PIR*$_{tb,n}$>maxPIR*$_{tb}$)

PIR*$_{tb,n}$=maxPIR*$_{tb}$.

Referring again specifically to FIG. 5, in step 518, the calculated $CIR_{tb,n}$ and PIR*$_{tb,n}$ values (e.g., tokens) may be written to the token bank for QID N and the slave QID.

Returning to step 512, if QID N is not a master/slave, the method proceeds to steps 520 and 522, where CIR and PIR* calculations, respectively, are performed for QID N. The calculations may be performed as described previously with respect to FIGS. 6a and 6b. In step 524, the calculated CIR and PIR* values may be written to the token bank for QID N, and the method may return to step 502.

Figure 7:
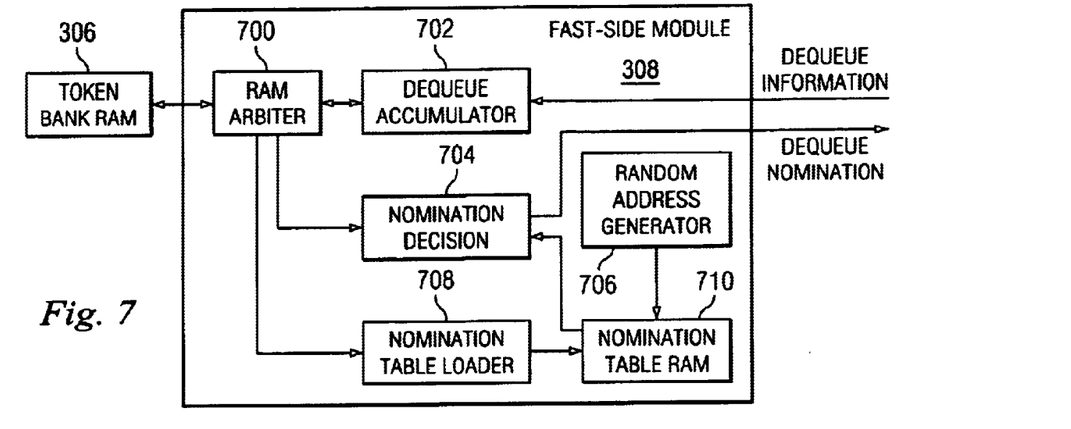
FIG. 7 is a diagram of a more detailed embodiment of the fast-side module of the scheduler of FIG. 3.

Referring now to FIG. 7, a more detailed example of the fast-side module 308 of FIG. 3 is illustrated. The fast-side module is used to control the dequeuing of information from the queues based on the CIR and PIR* "tokens" received from the slow-side module 304 via the token bank RAM 306. In the present example, the fast-side module includes a RAM arbiter 700, a dequeue accumulator 702, a nomination decision module 704, a random address generator 706, a nomination table loader 708, and nomination table RAM 710. The RAM arbiter 700 aids in the interaction of the token bank RAM 306 with the fast-side module 308. The dequeue accumulator 702 uses the RAM arbiter 700 to store a running sum of bytes dequeued over the millisecond window in the token bank RAM 306. It is understood that some components, such as the nomination table loader 708, may obtain information from the token bank 302 via the requests of other components (e.g., the nomination decision module 704) by "listening in" on the requests. As previously described, this information may be used by the slow-side module 304 during its calculations.

The fast-side module 308 employs a process to approximate fairness in the nomination of dequeue instructions to the memory system. To accomplish this, the fast-side module 308 uses a nomination table (stored in the nomination table RAM 710) that contains all the provisioned queue IDs and that has a number of nomination table entries that are proportional to the actual provisioned PIR. Accordingly, different weights may be created among queues based on their expected bandwidth.

A randomly distributed function provided by the random address generator 706 may be used to read the nomination table RAM 710. This allows for a distribution of queue nominations along the millsecond-window described previously, and may produce a traffic shaping effect on the uplinks. The randomly distributed function may also read the nomination table multiple times, providing a rate of nominations higher than, but proportional to, the queues' and/or uplink's bandwidth. This compensates for the loss of nominations by the memory system during back pressuring situations.

Figure 8:
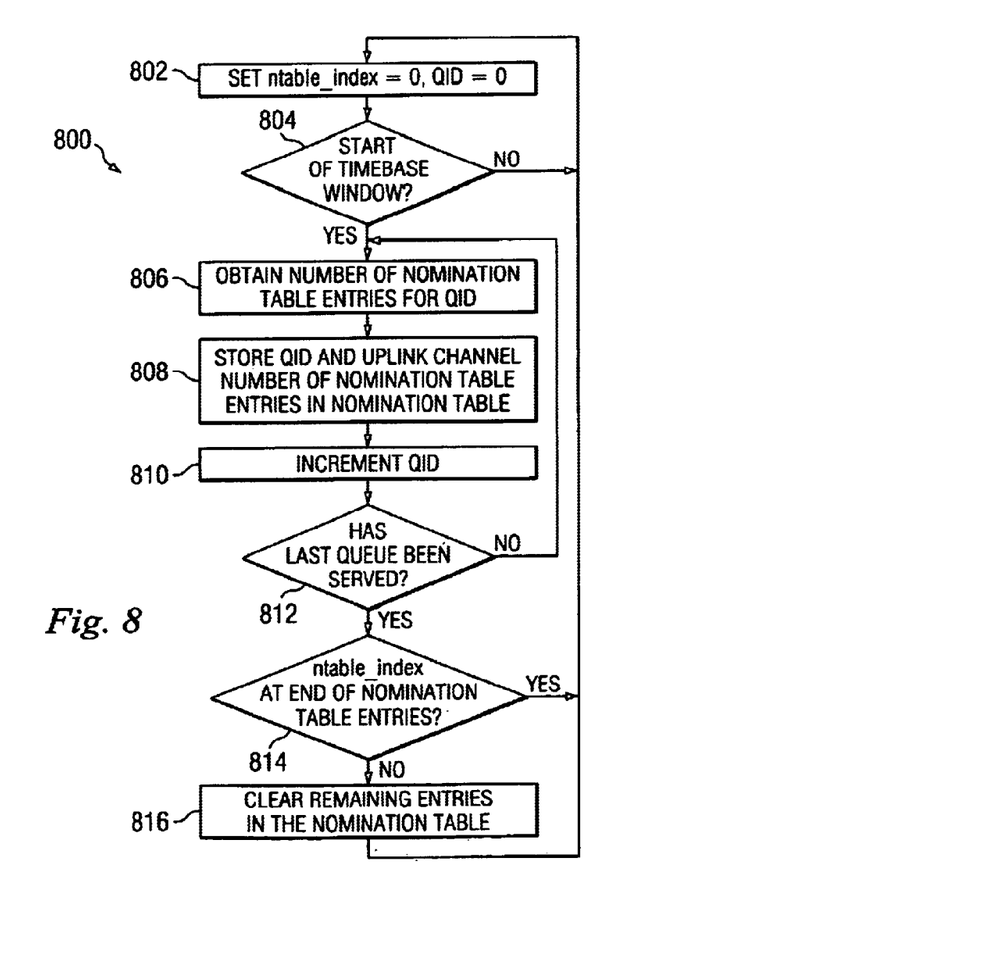
FIG. 8 is a flow chart of an exemplary method for loading a nomination table associated with the fast-side module of FIG. 7.

With additional reference to FIG. 8, an exemplary method 800 illustrates one process that may be used by the nomination table loader 708 of FIG. 7 to load the nomination table in the nomination table RAM 710. The loading of the nomination table may store the queue IDs linearly and at the start of a timebase window. This facilitates the life reprovisioning of the nomination table with minimal implementation needs and without affecting data rates. It is understood that any number of queues to multiple uplinks may be supported with little or no interference between the uplink nomination paths or among the queues.

In step 802, an index for the nomination table (ntable_index) and a QID are both set to zero. In step 804, a determination is made as to whether the method is at the start of a timebase window (e.g., the start of the one millisecond segment 400 of FIG. 4). If not, the method returns to step 802. If so, the method continues to step 806, where it obtains the number of nomination table entries for QID. In step 808, the QID and uplink channel number of nomination table entries are stored in the nomination table and, in step 810, the QID is incremented.

In step 812, a determination is made as to whether the last queue has been served. If not, the method 800 returns to step 806. If so, the method continues to step 814, where a determination is made as to whether the ntable_index is at the end of the nomination table entries. If so, the method 800 returns to step 802. If not, the method continues to step 816, where it clears the remaining entries in the nomination table before returning to step 802. Although not shown in FIG. 8, it is noted that all entries in the nomination table may be marked as invalid upon resetting.

The fast-side module 308 of the scheduler 300 executes using as a reference the ms-window. In addition and as a congestion control mechanism, it may break down the time base window into sub-windows to evaluate traffic, so connections that finish their token bank funds can be blocked from nominating early in the window. This may prevent unnecessary nominations that could affect other queues dequeing nominations from reaching the memory system. This may be helpful in cases of minimum vs. maximum PDU sizes. In addition, a force function per SPE may be added to allow a connection falling behind during a 1 ms-window to catch up over consecutive windows. Furthermore, an even faster reaction "lag" function used within a sub-window may be used to prevent connections from falling behind. The function may evaluate whether a queue is behind its previous sub-window share of bandwidth and is not currently being forced. If the queue meets these requirements, it is selected as a "lagging" queue. The scheduler 300 nominates this QID when the fast-side module 308 is not making any other nomination. These features may make the scheduler 300 more efficient in the generation of dequeue nominations, may reduce burstiness by setting the force logic as a last resort, and may enable the scheduler to support any frame size traffic without the need for burst size provisioning. Additionally, any number of queues to multiple uplinks may be supported without interference between the uplink nomination paths or among the queues.

Figure 9A:
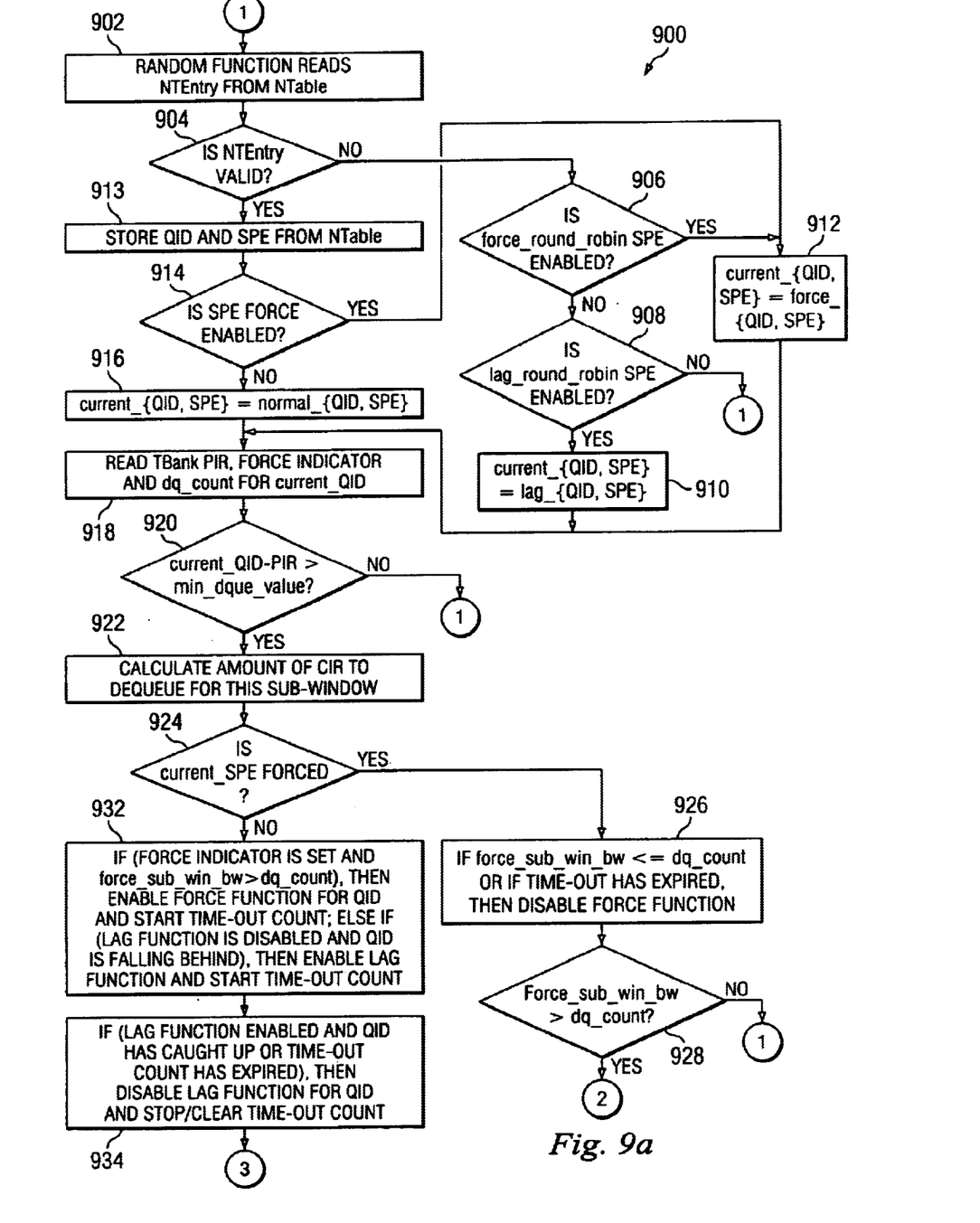
FIGS. 9a and 9b are a flow chart of an exemplary method for a nomination process that may be executed within the fast-side module of FIG. 7 using the nomination table to FIG. 8.
Figure 9B:
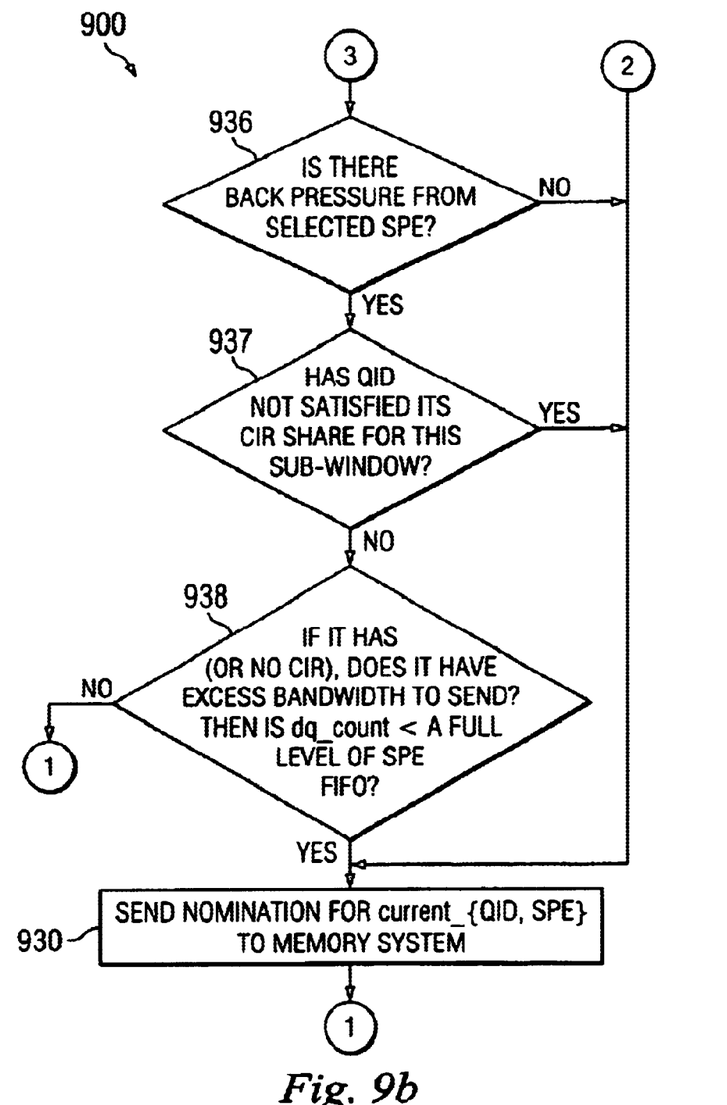

Referring now to FIGS. 9a and 9b, an exemplary method 900 illustrates one process that may be used for queue nomination in the fast-side module of 308 of FIG. 7. In the following example, each sub-window (sub_win_bw) is a fraction of the total CIR of the token bank (TBank CIR). The fraction depends on the current sub-window. In addition, the maximum limits for each time out counter may vary depending on the number of active uplinks (e.g., the SPEs).

In step 902, an entry (e.g., an NTEntry) is read from the nomination table using a random function (e.g., from the random address generator 706 of FIG. 7). In step 904, a determination is made as to whether NTEntry is valid. If NTEntry is not valid (so no QID), the method 900 continues to step 906, where a determination is made as to whether the queue is being forced per SPE (e.g., using round robin to select the SPE). If the queue is not being forced per SPE, a determination is made in step 908 as to whether the lag function is enabled for a selected SPE (where the selected SPE is chosen by a round robin process). If not, the method returns to step 902. If so, the method continues to step 910, where the current_{QID, SPE} is set equal to lag_{QID, SPE}. Returning to step 906, if force_round_robin SPE is enabled, the method 900 moves to step 912, where current_{QID, SPE} is set equal to force_{QID, SPE}. It is noted that both steps 910 and 912 continue to step 918, which will be described later in greater detail.

Returning to step 904, if NTEntry is valid, the QID and SPE received from the nomination table are stored in step 913. In step 914, a determination is made as to whether the SPE is being forced. If so, the method 900 moves to step 912, where current_{QID, SPE} is set equal to force_{QID, SPE} as previously described. If not, the method moves to step 916, where current_{QID, SPE} is set equal to normal_{QID, SPE}. From any of steps 910, 912, and 916, the method continues to step 918.

In step 918, the PIR, dq_count, and a force indicator (e.g., indicating that the current QID needs to be forced) for the current QID are obtained from the token bank. In step 920, a determination is made as to whether the current QID PIR is greater than a minimum dequeue value allowed. If not, the method 900 returns to step 902. If so, in step 922, a calculation is made as to the amount of CIR (e.g., number of CIR tokens) that is to be dequeued for the current sub-window.

In step 924, a determination may be made as to whether the current SPE is being forced. If it is being forced, the method continues to step 926, where the force function is disabled if either force_sub_window_bw (e.g., indicating a minimum amount of CIR tokens to be forced in the current sub-window) is less than or equal to dq_count or a timer has expired. In step 928, a determination is made as to whether force_sub_window_bw is greater than dq_count. If it is not, the method 900 returns to step 902. If it is, the method 900 continues to step 930, where a nomination is sent to the memory system for current_{QID, SPE}.

Returning to step 924, if the current SPE is not being forced, the method 900 moves to step 932. In step 932, if the force indicator is set and force_sub_window_bw is greater than dq_count, the force function is enabled for QID and a time out count is started. Otherwise, if the lag function is disabled and QID is falling behind, the lag function is enabled for QID and the time out count is started. In step 934, if the lag function is enabled and QID has caught up or the time out count has expired, the lag function is disabled and a time out count is stopped and cleared. In step 936, a determination is made as to whether there is back pressure from the selected SPE. If there is not, the method continues to step 930, where a nomination is sent to the memory system for current_{QID, SPE}. If there is back pressure, the method moves to step 938. In step 938, if QID has not satisfied its CIR share for the current sub-window, then the method continues to step 930, where a nomination is sent to the memory system for current_{QID, SPE}. Otherwise, if it has (or there is no CIR) but it has excess bandwidth, then a determination is made as to whether dq_count is less than an almost full level of the SPE's FIFO. This aids in identifying one or more queues that may be responsible for filling the FIFO, and enables continued dequeuing from queues not responsible. If not, the method returns to step 902. If so, the method continues to step 930, Accordingly, as described above, the scheduler 300 may ensure that each queue receives at least the provisioned CIR bandwidth given that the queue contains PDUs to be dequeued, and may also ensure that each connection receives at most the provisioned PIR bandwidth given that the queue contains PDUs to be dequeued. In some examples, the scheduler may ensure that the uplink bandwidth is filled completely given there is enough offered traffic within the provisioned parameters to keep the uplink filled. In still other examples, the scheduler may ensure that extra bandwidth (that is, PIR bandwidth in excess of CIR) is shared evenly on a proportional basis at all times.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Furthermore, various changes may be made to the methods and/or the scheduler to conform to various networks and/or protocols. Therefore, the claims should be interpreted in a broad manner, consistent with the present disclosure.

What is claimed is:

1. A method for scheduling traffic in a communications network, the method comprising:
    assigning at least one token to each of a plurality of active queues during a predefined period of time, wherein each token authorizes an amount of data to be dequeued from its respective queue;
    waiting until the end of the predefined period of time before starting a new round of assigning;
    nominating at least one of the queues based on the at least one token assigned to the queue, wherein the nominating authorizes the dequeuing of the amount of data from the queue; and
    sending the nomination to a memory system to dequeue the data and send the data to a network uplink.

2. The method of claim 1 wherein nominating at least one of the queues includes:
    loading a plurality of entries into a nomination table based on the plurality of tokens, wherein the loading occurs linearly by queue; and
    selecting at least one of the entries from the nomination table by generating a random address and retrieving the entry located at the random address.

3. The method of claim 2 wherein the selecting occurs a defined number of iterations during the predefined period of time, and wherein the defined number is proportional to a total uplink bandwidth.

4. The method of claim 1 further comprising calculating first and second tokens for each queue, wherein the first token is based on a first per-queue rate defining a minimum rate at which to admit traffic to the network, and the second token is based on a per-queue rate defining a maximum rate at which to admit traffic to the network given a non-empty queue.

5. The method of claim 4 further comprising, prior to calculating the first and second tokens for a queue, determining whether the queue is active.

6. The method of claim 5 wherein the determining is based on an identifier associated with the queue that identifies whether the queue is carrying traffic to be dequeued.

7. The method of claim 1 further comprising retrieving provisioning information for a queue prior to calculating the at least one token for that queue.

8. The method of claim 1 further comprising retrieving queue information from the memory system prior to calculating the at least one token for that queue.

9. The method of claim 8 wherein the queue information includes a number of bytes enqueued into the memory system, a queue number of a queue to which data was enqueued, a number of bytes dequeued from the memory system, and a queue number of a queue from which data was dequeued.

10. The method of claim 1 further comprising allocating unused bandwidth from one queue to an associated queue.

11. The method of claim 10 wherein the unused bandwidth is calculated based on a minimum rate at which to admit traffic to the network given a non-empty queue.

12. The method of claim 1 further comprising calculating an uplink overhead bandwidth used on a per-frame basis.

13. The method of claim 1 wherein nominating occurs at a rate greater than is needed to fill a maximum possible bandwidth of the uplink.

14. A system for scheduling uplink traffic in a communications network, the system comprising:
    a slow-side module configured to calculate first and second tokens for each of a plurality of queues, wherein the first token represents a minimum rate at which to admit traffic to the network given a non-empty queue, and the second token represents a maximum rate at which to admit traffic to the network given a non-empty queue;
    a fast-side module configured to direct the dequeuing of information from the plurality of queues based on the first and second tokens; and
    a token bank positioned between the slow-side and fast-side modules, wherein the slow-side module stores the first and second tokens in the token bank and the fast-side module removes the first and second tokens from the token bank.

15. The system of claim 14 wherein the slow-side module is configured to calculate each of the first and second tokens during a predefined period of time.

16. The system of claim 15 wherein the slow-side module is configured to wait until the end of the predefined period of time before beginning to calculate new first and second tokens for each of the plurality of queues.

17. The system of claim 14 wherein the slow-side module is configured to calculate each of the first and second tokens on a per-bit basis.

18. The system of claim 14 wherein the slow-side module is configured to calculate each of the first and second tokens on a per-octet basis.

19. The system of claim 14 wherein first and second queues are associated, and wherein the slow-side is configured to allocate unused tokens from the first queue to the second queue.

20. The system of claim 14 wherein the slow-side and fast-side modules are in communication with a queuing system.

* * * * *